:::{.patent-header}

United States Patent
Inui et al.

(10) Patent No.: US 7,466,105 B2
(45) Date of Patent: Dec. 16, 2008
:::

(54) AUTONOMIC BATTERY RECONDITIONING

(75) Inventors: Takashi Inui, Yokohama (JP); Mizuho Tadokoro, Yamato (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 444 days.

(21) Appl. No.: 11/015,820

(22) Filed: Dec. 17, 2004

(65) Prior Publication Data

US 2005/0156570 A1 Jul. 21, 2005

(30) Foreign Application Priority Data

Dec. 22, 2003 (JP) ............... 2003-425113

(51) Int. Cl.
*H02J 7/00* (2006.01)
(52) U.S. Cl. .................. 320/132; 320/133; 324/432
(58) Field of Classification Search ........... 320/132, 320/133, 149, DIG. 21; 324/426, 432
See application file for complete search history.

(56) References Cited

U.S. PATENT DOCUMENTS

| | | | | | |
|---|---|---|---|---|---|
| 4,670,703 | A | * | 6/1987 | Williams | 320/125 |
| 5,463,305 | A | * | 10/1995 | Koenck | 320/145 |
| 5,493,196 | A | * | 2/1996 | Feldstein | 320/118 |
| 5,684,384 | A | * | 11/1997 | Barkat et al. | 307/66 |
| 5,717,256 | A | * | 2/1998 | Okumura et al. | 307/66 |
| 5,739,671 | A | * | 4/1998 | Hamada | 320/149 |
| 5,751,134 | A | * | 5/1998 | Hoerner et al. | 320/124 |
| 5,994,876 | A | * | 11/1999 | Canny et al. | 320/132 |
| 6,049,141 | A | * | 4/2000 | Sieminski et al. | 307/44 |
| 6,133,739 | A | * | 10/2000 | Kvaas et al. | 324/426 |
| 6,300,763 | B1 | * | 10/2001 | Kwok | 324/427 |
| 6,329,822 | B1 | * | 12/2001 | Powers | 324/426 |
| 6,501,249 | B1 | * | 12/2002 | Drori | 320/149 |
| 6,522,104 | B1 | * | 2/2003 | Drori | 320/149 |
| 6,624,635 | B1 | * | 9/2003 | Lui | 324/426 |
| 6,625,552 | B1 | * | 9/2003 | Delvecchio et al. | 702/63 |
| 6,664,764 | B1 | * | 12/2003 | Odaohhara | 320/132 |
| 6,940,255 | B2 | * | 9/2005 | Loch | 320/132 |
| 7,135,839 | B2 | * | 11/2006 | Iida et al. | 320/149 |
| 2002/0101218 | A1 | * | 8/2002 | Koenck et al. | 320/140 |
| 2002/0163991 | A1 | * | 11/2002 | Stessman | 377/19 |

(Continued)

FOREIGN PATENT DOCUMENTS

JP 09-205736 5/1997

(Continued)

*Primary Examiner*—Akm E Ullah
*Assistant Examiner*—M'Baye Diao
(74) *Attorney, Agent, or Firm*—John L. Rogitz (57) ABSTRACT

An information processing apparatus that is driven by a rechargeable battery, wherein the battery is depleted from a fully charged state and repeatedly charged and discharged, comprises a full charge capacity acquisition unit for acquiring a present full charge capacity of the battery which the battery has at the present time, a total charge acquiring unit for acquiring information indicating a total amount of charge provided to the battery in a time period from a start time of using the battery until the present full charge capacity is acquired, and a restoring unit for performing a battery restoration in which the battery is fully discharged or fully charged in order to recover the full charge capacity if it is determined that the present full charge capacity is smaller than an expected full charge capacity that the battery should have depending on the information.

6 Claims, 10 Drawing Sheets

U.S. PATENT DOCUMENTS

2005/0134221 A1 * 6/2005 Wanibuchi et al. .......... 320/128

FOREIGN PATENT DOCUMENTS

| JP | 09-233722 | 9/1997 |
| JP | 2001-136673 | 5/2001 |
| JP | 2002-223529 | 8/2002 |
| JP | 2002-238177 | 8/2002 |
| JP | 2002-315198 | 10/2002 |

* cited by examiner

System use history

| Day of the week | Time zone | | Drivable by AC power source | Operating in G0 state | Operating in G1 state | OFF state |
|---|---|---|---|---|---|---|
| | Time | | | | | |
| Sunday | 0:00~0:10 | | 100% | 25% | 25% | 50% |
| | 0:10~0:20 | | 75% | 25% | 25% | 50% |
| | ... | | ... | ... | ... | ... |
| Monday | 0:00~0:10 | | 25% | 25% | 25% | 50% |
| | 8:00~8:10 | | 50% | 25% | 25% | 50% |
| | 8:10~8:20 | | 75% | 50% | 50% | 0 |
| | 8:20~8:30 | | 75% | 50% | 50% | 0 |
| | ... | | ... | ... | ... | ... |
| | 16:00~16:10 | | 100% | 100% | 0 | 0 |
| ... | | | | | | |
| Saturday | 10:00~10:10 | | 10% | 85% | 0 | 15% |
| | 10:10~10:20 | | 5% | 90% | 5% | 5% |
| | ... | | ... | ... | ... | ... |
| | 18:00~18:10 | | 10% | 95% | 0% | 5% |
| | 18:10~18:20 | | 5% | 90% | 0% | 10% |
| | ... | | ... | ... | ... | ... |

| Battery use history | | | | | | | |
|---|---|---|---|---|---|---|---|
| Serial number | Cycle count | Full charge capacity | Discharge information | | | Charge information | |
| | | | Number of times | Discharge start remaining amount | Discharge time | Number of times | Charge start remaining amount | Charge time |

| Battery use history | | | | | | | | |
|---|---|---|---|---|---|---|---|---|
| Serial number | Cycle count | Full charge capacity | \multicolumn{3}{Discharge information} | | \multicolumn{3}{Charge information} | |
| | | | Number of times | Discharge start remaining amount | Discharge time | Number of times | Charge start remaining amount | Charge time |
| 32×××× | 24 | 3431 | 62 | 98% | 1.2 | 65 | 72% | 1 |
| | | | | 86% | 0.5 | | 92% | 0.5 |
| | | | | ...... | ...... | | ...... | ...... |
| ...... | ...... | ...... | | | | | | |

AUTONOMIC BATTERY RECONDITIONING

BACKGROUND OF THE INVENTION

The present invention relates to an information processing apparatus that is driven by a rechargeable battery, a control method, and a computer program product. More particularly, the invention relates to an information processing apparatus for controlling the charge and discharge of a battery, a control method, and a computer program product.

In recent years, information terminals of small size and light weight have been widely employed. Each information terminal is mostly provided with a repeatedly chargeable battery to be usable by carrying at a place of destination or out in the fields. Such a battery is charged by an AC power source, when the information terminal is connected to the AC power source, and if the information terminal is disconnected from the AC power source, the battery can drive the information terminal.

Various kinds of batteries may be employed, including a nickel cadmium battery, a nickel hydrogen battery and a lithium ion battery. Generally, the battery is deteriorated if the charge and discharge are repeated. For example, in the nickel cadmium battery, a memory effect due to extension charge has a problem. Also, there is another problem in which a control circuit contained in the battery does not appropriately manage the full charge capacity that is changed when the charge and discharge are repeated.

Various techniques have been proposed to solve these problems (refer to Patent Documents 1 to 6).

[Patent Document 1]
Published Unexamined Patent Application No. 9-233722

[Patent Document 2]
Published Unexamined Patent Application No. 9-205736

[Patent Document 3]
Published Unexamined Patent Application No. 2001-136673

[Patent Document 4]
Published Unexamined Patent Application No. 2002-315198

[Patent Document 5]
Published Unexamined Patent Application No. 2002-223529

[Patent Document 6]
Published Unexamined Patent Application No. 2002-238177

DISCLOSURE OF INVENTION

Conventionally, a technique has been employed in which if an information terminal is connected to the AC power source, charging the battery is automatically started even when the user does not give any instruction. This can eliminate the complex operation for charging and improve the operability, and make the remaining amount of the battery kept as high as possible. With this technique, even when the remaining amount of the battery is sufficiently large and the charge is unnecessary, the information terminal starts to be charged if connected to the AC power source. Therefore, the number of times of charging the battery is increased, the deterioration of the battery can be accelerated.

As a battery degrades, the full charge capacity of the battery decreases. A control circuit contained in the battery changes the upper limit of the charge capacity according to information such as the number of charges and recharges, the capacity of charge and discharge, and the terminal voltage of the battery in order to prevent overcharge of the battery. However, if a battery is repeatedly discharged and charged in a short time, accumulated errors in information concerning the battery may cause a difference between an actual full charge capacity and the upper-limit charge capacity set by the control circuit. A user can perform battery restoration in which the battery is repeatedly fully discharged and charged in order to return the upper limit charge capacity set by the control circuit to the actual full charge capacity. However, the restoration requires relatively long time and yet it is difficult for the user to determine beforehand whether or not the restoration actually can restore the battery to its full charge capacity. Therefore, there have been cases where batteries have not fully provided their actual capabilities.

SUMMARY OF THE INVENTION

Thus, it is a purpose of the invention to provide an information processing apparatus, a control method, and a computer program product in which the above-mentioned problems are solved. This purpose is achieved by a combination of features as defined in independent claims of the invention. Also, the dependent claims define the more beneficial aspect of the invention.

In order to accomplish the above purpose, according to a first aspect of the invention, there are provided an information processing apparatus that is driven by a rechargeable battery, a control method, and a computer program product, in which a full charge capacity of the battery, in a state where the battery is fully charged, is decreased by repeatedly charging or discharging the battery, the apparatus comprising a full charge capacity acquisition unit for acquiring the present full charge capacity of the battery that is a full charge capacity which said battery has at the present time, a total charge amount acquisition unit for acquiring information indicating a total amount of charge provided to said battery in a time period from a start time of using said battery until said present full charge capacity is acquired, and a restoring unit for performing a battery restoration by fully discharging or fully charging the battery if the present full charge capacity is smaller than an expected full charge capacity that said battery should have depending on said information.

The above summary of the invention does not enumerate all the necessary features of the invention, but sub-combinations of those features may constitute the invention.

The embodiments disclosed it is possible to make effective use of a rechargeable battery.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. Additionally, not all the combinations of features as described in those embodiments are not required for solving means of the invention.

Figure 1:
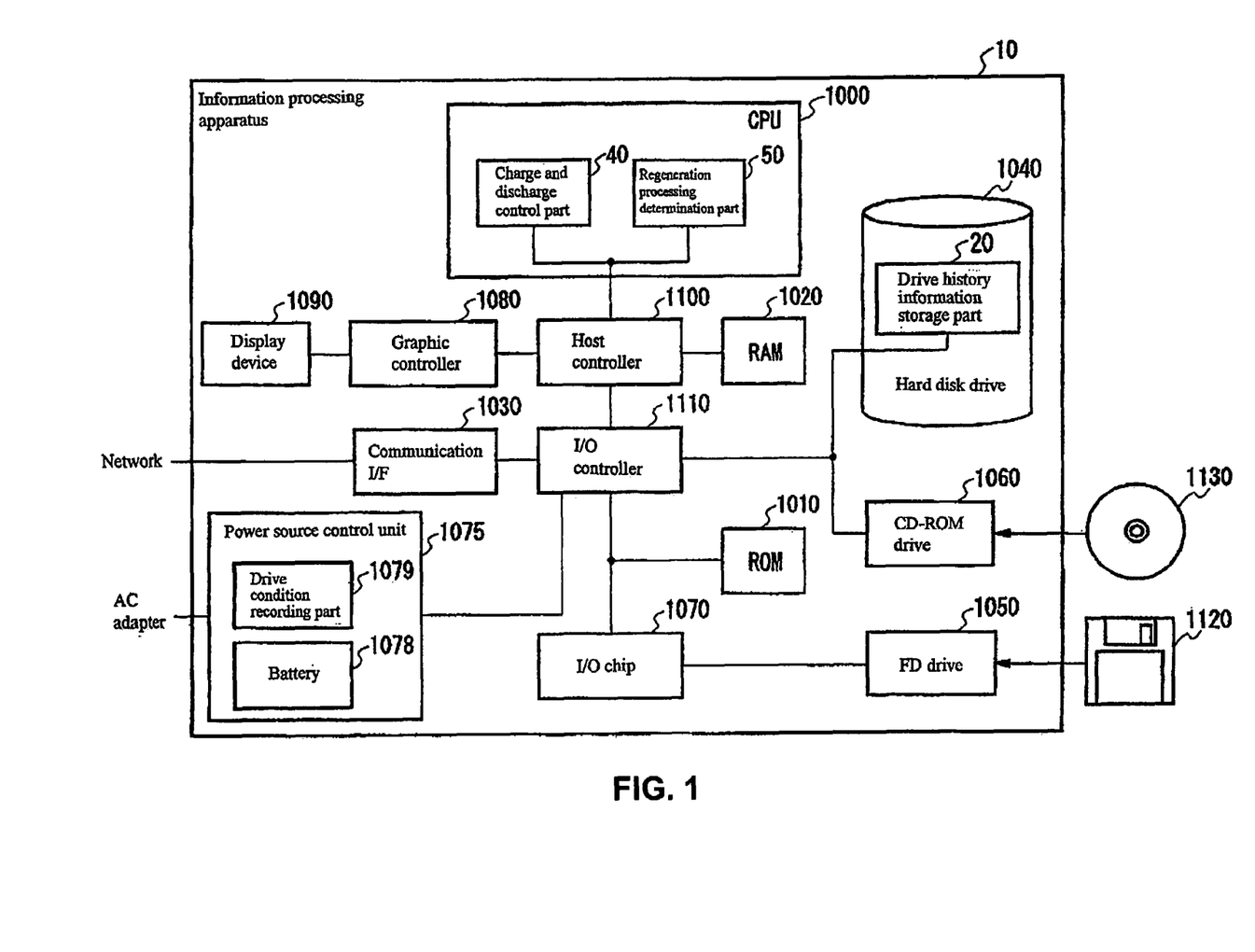
FIG. 1 is a block diagram of an information processing apparatus 10.

Referring now more particularly to the accompanying drawings, in which like numerals indicate like elements or steps throughout the several views, FIG. 1 is a block diagram of an information processing apparatus 10. The information processing apparatus 10 aims to appropriately adjust the conditions for charging the battery to prevent deterioration of the battery, and adjust the timing of performing a battery restoration process for restoring the deteriorated battery.

The information processing apparatus 10 comprises a CPU peripheral part having a CPU 1000, a RAM 1020, a graphic controller 1080 and a display device 1090, which are interconnected by a host controller 1100, an input-output part having a communication interface 1030, a hard disk drive 1040 and a CD-ROM drive 1060, which are connected to the host controller 1100 by an I/O controller 1110, and a legacy input-output part having a ROM 1010, a flexible disk drive 1050, an I/O chip 1070, and a power source control unit 1075, which are connected to the I/O controller 1110. The host controller 1100 connects the RAM 1020, the CPU 1000 accessing the RAM 1020 at high transfer rate, and the graphic controller 1080.

The CPU 1000 operates in accordance with the programs stored in the ROM 1010 and the RAM 1020 to control each part. For example, the CPU 1000 functions as a charge and discharge control part 40 for setting up the conditions for starting the charge of a battery 1078 and the conditions for stopping the charge that is started, and a battery restoration determination unit 50 for performing a battery restoration process for recovering the full charge capacity that is deteriorated by repeated charge and discharge. As one example, the charge and discharge control unit 40 and the restoration process determination unit 50 may be implemented as one function of the operating system for managing the information processing apparatus 10, a device driver operating on the operating system and controlling a power source control unit 1075, or a BIOS program stored in the ROM 1010.

The communication interface 1030 communicates via a network with an external device. The hard disk drive 1040 stores the programs and data used by the information processing apparatus 10. For example, the hard disk drive 1040 functions as a drive history information storage part 20 for storing the drive history information recording which of the AC power source and the battery 1078 drove the information processing apparatus 10 in a predetermined past term. In the following, the predetermined past term is called a drive situation observation term. Also, the information processing apparatus 10 operates in either a normal mode in which the CPU 1000 performs the arithmetical operation or a power saving mode in which the CPU 1000 does not perform the arithmetical operation and has a smaller consumption power. The drive history information storage part 20 may further store the drive history information indicating in which of the normal mode and the power saving mode the information processing apparatus 10 operated in the predetermined past term.

The power source control unit 1075, which can be attached to or detached from an AC adapter externally provided, supplies electric power acquired from the AC adapter or the battery 1078 to each part of the information processing apparatus 10. Also, the power source control unit 1075 starts or stops the charge of the battery 1078, upon receiving an instruction from the CPU 1000 via the I/O controller 1110. Also, the power source control unit 1075 has a drive condition recording part 1079 for detecting a drive condition of the information processing apparatus 10 periodically and recording it in the drive history information storage part 20. The graphic controller 1080 acquires the image data which the CPU 1000 produces on a frame buffer provided within the RAM 1020, and displays it on, the display device 1090. Instead, the graphic controller 1080 may internally contain the frame buffer for storing the image data produced by the CPU 1000. The I/O controller 1110 connects the host controller 1100 with the communication interface 1030 that is an input-output device having relatively high speed, the hard disk drive 1040 and the CD-ROM drive 1060.

The CD-ROM drive 1060 reads the program or data from the CD-ROM 1130, and provides it via the RAM 1020 to the I/O chip 1070. The I/O controller 1110 is connected to the ROM 1010 and the input-output devices having relatively low speed such as the flexible disk drive 1050 and the I/O chip 1070. The ROM 1010 stores a boot program that the CPU 1000 performs when initiating the information processing apparatus 10, and the programs dependent on the hardware of the information processing apparatus 10. The flexible disk drive 1050 reads the program or data from the flexible disk 1120, and provides it via the RAM 1020 to the I/O chip 1070. The I/O chip 1070 is connected to the flexible disk 1120 and various kinds of input-output devices via a parallel port, a serial port, a keyboard port, and a mouse port.

The program provided to the information processing apparatus 10 is stored in the recording medium such as the flexible disk 1120, the CD-ROM 1130, or the IC card, and provided to the user. The program is read from the recording medium via the I/O chip 1070 and/or I/O controller 1110, and installed and executed in the information processing apparatus 10. The program installed and executed in the information processing apparatus 10 includes various kinds of modules for enabling the CPU 1000 to function as the charge and discharge control unit 40 and the restoration process determination unit 50. Also, this program enables the hard disk drive 1040 to function as the drive history information storage part 20. The operation of each module acting on the information processing apparatus 10 will be described later with reference to the FIGS. 2 to 10.

The program or module as described above may be stored in an external storage medium. Examples of the storage medium include the flexible disk 1120, the CD-ROM 1130, optical recording media such as DVD and PD, an optical magnetic recording medium such as MD, a tape medium, and a semiconductor memory such as IC card. Also, the storage device such as hard disk or RAM provided in a server system connected to a private communication network or the Internet may be employed as the recording medium, and the program provided via the network to the information processing apparatus 10.

Figure 2:
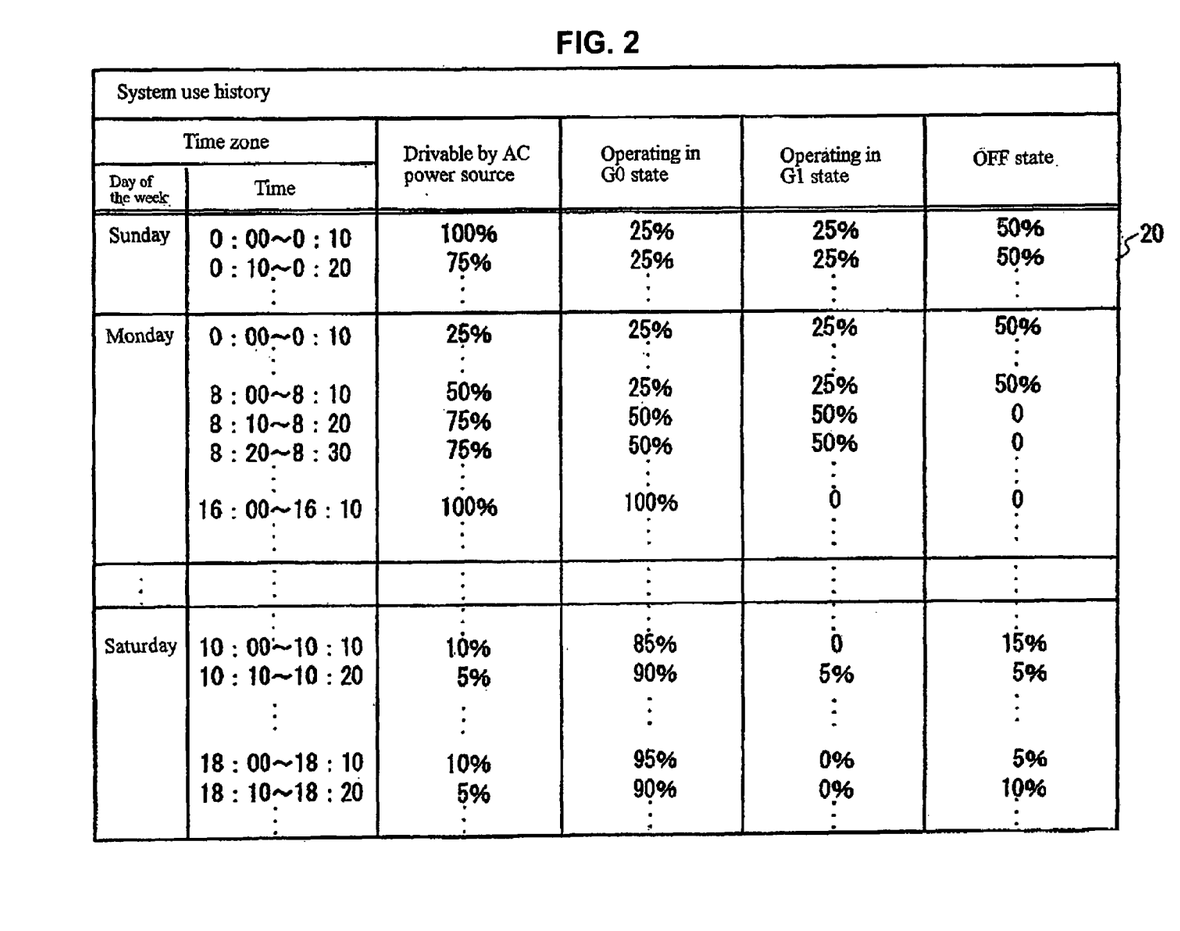
FIG. 2 shows an example of a system use history among the drive history information stored in the drive history information storage part 20.

FIG. 2 shows an example of a system use history among the drive history information that the drive history information storage part 20 stores. The drive history information storage part 20 stores a system use history of recording, for each time zone, a percentage of the time in which the information processing apparatus 10 can be driven by the AC power source, a percentage of the time in which the information processing apparatus 10 operates in a G0 state, a percentage of the time in which the information processing apparatus 10 operates in a G1 state and a percentage of the time in which the information processing apparatus 10 is in an OFF state. Herein, the state where the information processing apparatus 10 can be driven by the AC power source may be the state where the information processing apparatus 10 is attached with the AC adapter, or the state where the information processing apparatus 10 is actually supplied with electric power from the AC adapter, for example.

Also, the G0 state is an example of the normal mode in which the CPU 1000 of the information processing apparatus 10 performs the arithmetical operation. Also, the G1 state is an example of the power saving mode in which the CPU 1000 does not perform the arithmetical operation and has a smaller consumption power than in the G0 state. More particularly, the G1 state is a sleeve mode, for example, in which the information processing apparatus 10 stops the power supply to the CPU 1000 and supplies power to the RAM 1020 alone to temporarily suspend the operation of the information processing apparatus 10. Also, the OFF state is the state where the power supply of the information processing apparatus 10 is shut off, specifically, the state where the power supply to the CPU 1000 and the RAM 1020 is stopped. In this connection, the OFF state is called a G2 state, G3 state, a hibernation mode or a stop mode.

In this embodiment, a time zone is a time range of 10 minutes by which one week period is partitioned, and is represented by a combination of the day of the week and the time. For example, the percentage of time that the information processing apparatus is driven by the AC power source in the time zone from 0:00 to 0:10 on Sunday is the average value of the percentages of the time that the information processing apparatus can be driven by the AC power source in the time zone from 0:00 to 0:10 on all Sundays of the previous eight weeks. Instead, the time zone may be a time range in which one day is partitioned into every 10 minutes, or each weekday or holiday is partitioned into every 10 minutes.

Also, the drive condition recording part 1079 detects a drive situation of the information processing apparatus 10 periodically, and records the detected result in the drive history information storage part 20 in a format as illustrated in FIG. 2. For example, the drive condition recording part 1079 may consider, in each time zone, that the information processing apparatus 10 can be driven by the AC power source over the entire time zone, if the information processing apparatus 10 can be driven by the AC power source at the start of the time zone. Also, the drive condition recording part 1079 may detect by multiple times whether or not the information processing apparatus 10 can be driven by the AC power source in the time zone. In this case, the drive condition recording part 1079 may deal with the percentage of the number of times that the information processing apparatus 10 can be driven by the AC power source at each time of detection to the detection number of times, as the percentage of the time that the information processing apparatus 10 can be driven by the AC power source in each time zone.

Figure 3:
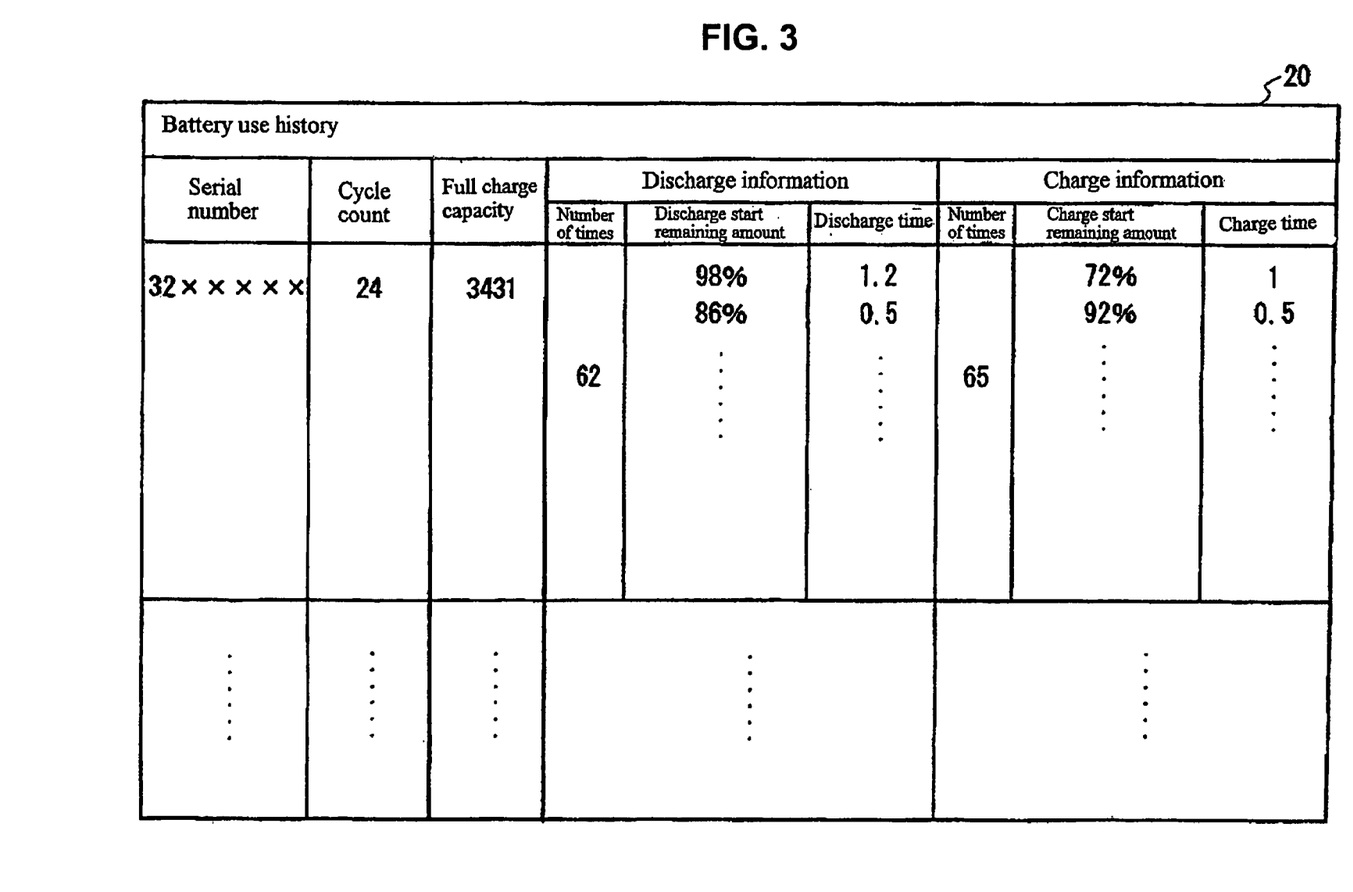
FIG. 3 shows an example of a battery use history among the drive history information stored in the drive history information storage part 20.

FIG. 3 shows an example of a battery use history among the drive history information stored in the drive history information storage part 20. The drive history information storage part 20 stores a battery use history, including relationally a serial number of battery, a cycle count indicating the total charge capacity from the start time of using the battery to the current time, a full charge capacity that is the capacity of the battery that is fully charged at present, the discharge information regarding the discharge of the battery, and the charge information regarding the charge of the battery, for each battery mounted on the information processing apparatus 10.

The drive history information storage part 20 stores, as the discharge information, for each battery, the number of times that the information processing apparatus 10 is driven by the battery from the start time of using the battery to the current time, namely, the number of times of discharging the battery, the remaining amount of the battery at the start time of discharge, and the time required for discharge. Also, the drive history information storage part 20 stores, as the charge information, for each battery, the number of times of charging the battery from the start time of using the battery to the current time, the remaining amount of the battery at the start time of charge, and the time required for charge.

Figure 4:
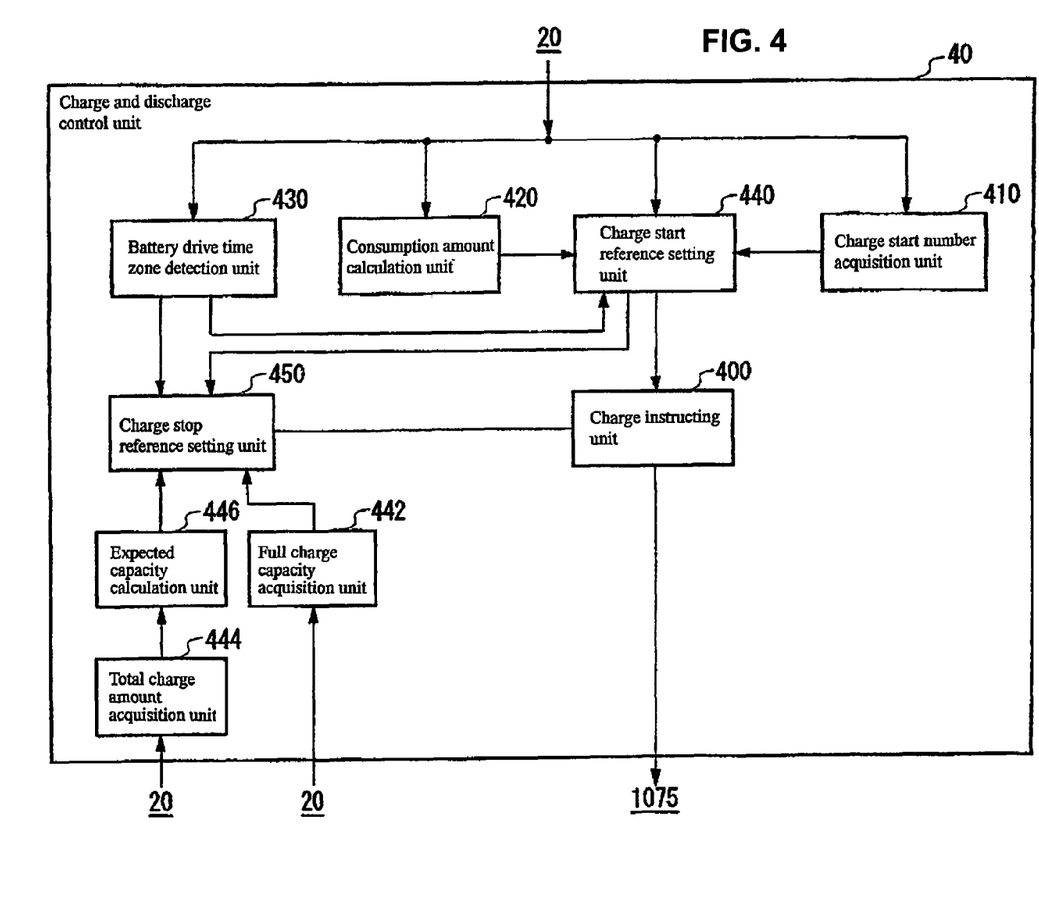
FIG. 4 is a block diagram of the charge and discharge control unit 40.

FIG. 4 is a block diagram of the charge and discharge control part 40. The charge and discharge control unit 40 has a charge instructing unit 400, a charge start number acquisition unit 410, a consumption amount calculation unit 420, a battery drive time zone detection unit 430, a charge start reference setting unit 440, a full charge capacity acquisition part 442, a total charge amount acquisition unit 444, an expected capacity calculation unit 446, and a charge stop reference setting unit 450. A charge instructing unit 400 starts to charge the battery 1078 by the AC power source, providing that the remaining amount of the battery 1078 is lower than a preset charge start reference remaining amount, and stops to charge the battery 1078, providing that the remaining amount of the battery 1078 reaches a preset charge stop reference remaining amount, in the case where the information processing apparatus 10 is driven by the AC power source. The charge instructing unit 400 charges the battery 1078 by the AC power source, irrespective of the charge start reference remaining amount or charge stop reference remaining amount, if an emergency charge instruction is issued from the user.

The charge start number acquisition unit 410 calculates the number of times that the remaining amount of the battery 1078 at the start time of charging in a drive situation observation term is more than a preset charge start reference remaining amount candidate below the charge start reference remaining amount, based on the drive history information acquired from the drive history information storage part 20. The consumption amount calculation unit 420 calculates the maximum consumption amount that the information processing apparatus 10 consumes the battery 1078 continuously without being driven by the AC power source in the past, based on the drive history information acquired from the drive history information storage part 20. The battery drive time zone detection unit 430 detects the battery drive time zone that is the continuous time zone in which the percentage of the time that the information processing apparatus 10 is driven by the battery 1078 in the past is higher than a preset reference percentage, based on the drive history information acquired from the drive history information storage part 20.

The charge start reference setting unit 440 sets up the charge start reference remaining amount, based on the number of times that the remaining amount of the battery 1078 at the start time of charging in the drive situation observation term is more than the charge start reference remaining amount candidate, and the calculated maximum consumption amount of the battery 1078. Also, the charge start reference setting unit 440 decreases the charge start reference remaining amount when the information processing apparatus 10 operates in the G0 state in the drive situation observation term if the time of driving by the battery 1078 is shorter. Moreover, the charge start reference setting unit 440 increases the charge start reference remaining amount when approaching the battery drive time zone. Also, the charge start reference setting unit 440 may change the charge start reference remaining amount, based on an input frequency of emergency charge instruction.

The full charge capacity acquisition unit 442 acquires the present full charge capacity of the battery 1078 from the drive history information storage part 20. The total charge amount acquisition unit 444 acquires the cycle count indicating the total charge amount from the start time of using the battery 1078 to the present time from the drive history information storage part 20. The expected capacity calculation unit 446 calculates the expected capacity that is the full charge capacity which the battery 1078 should have at the present time, based on the full charge capacity (e.g., rated capacity) at the start time of using the battery 1078 and the cycle count.

The charge stop reference setting unit 450 sets the charge stop reference remaining amount to a smaller value than the full charge capacity of the battery 1078, based on the drive history information acquired from the drive history information storage part 20, if the charge start reference setting unit 440 decreases the charge start reference remaining amount and the present full charge capacity of the battery 1078 is smaller than the expected capacity. For example, the charge stop reference setting unit 450 sets up the charge stop reference remaining amount in the time zone from the end time of the first battery drive time zone to the start time of the second battery drive time zone, based on the consumption amount of the battery 1078 in the past in the second battery drive time zone. Also, the charge stop reference setting unit 450 may change the charge stop reference remaining amount, based on the input frequency of emergency charge instruction.

Figure 5:
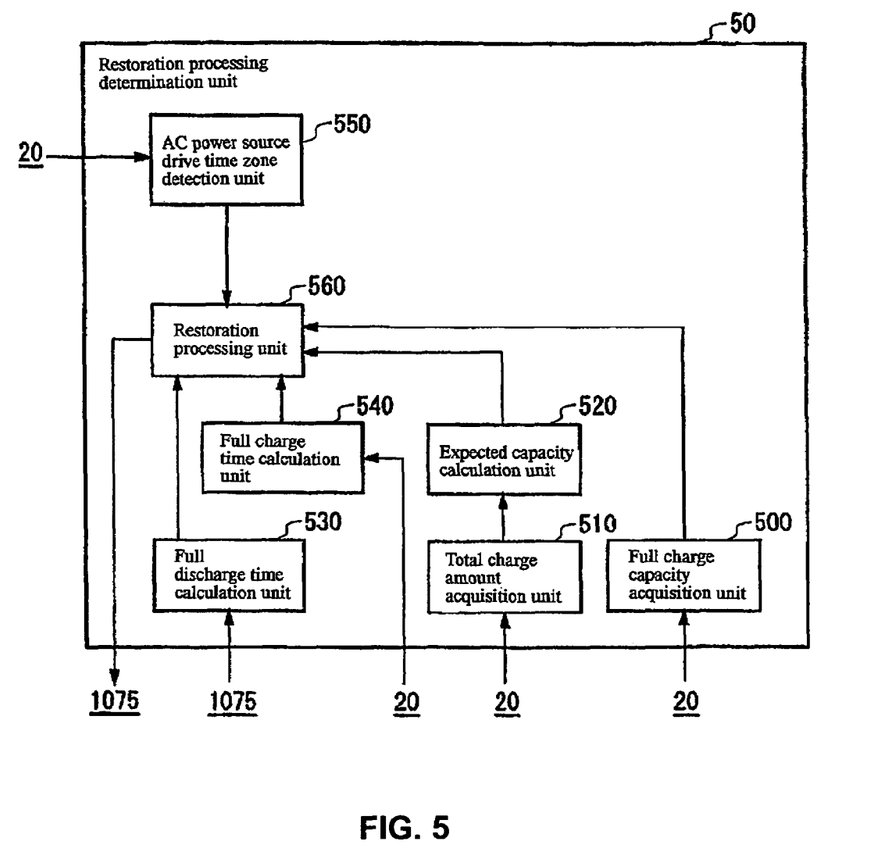
FIG. 5 is a block diagram of the restoration processing determination unit 50.

FIG. 5 is a block diagram of the restoration processing determination unit 50. The full charge capacity acquiring unit 500 acquires the present full charge capacity of the battery 1078 from the drive history information storage part 20. The total charge amount acquisition unit 510 acquires the cycle count indicating the total charge amount from the start time of using the battery 1078 to the present time from the drive history information storage part 20. The expected capacity calculation unit 520 calculates the expected capacity that is the full charge capacity which the battery 1078 should have at the present time, based on the full charge capacity (e.g., rated capacity) at the start time of using the battery 1078 and the cycle count.

The full discharge time calculation unit 530 calculates the full discharge time that is the estimation of the time required to perform a process of fully discharging the battery 1078, based on the present remaining amount of the battery 1078 acquired from the power source control unit 1075. The full charge time calculation unit 540 calculates the full charge time that is the estimation of the time required for said battery to become fully charged after being fully discharged by obtaining the time required to charge the full charge capacity acquired from the drive history information storage part 20, for example.

The AC power source drive time zone detection unit 550 detects the time zone in which the percentage of driving the information processing apparatus 10 by the AC power source in the past is a preset reference value or more, as the AC power source drive time zone in which the information processing apparatus 10 is expected to be driven by the AC power source, based on the drive history information. The restoration processing unit 560 performs a battery restoration process for making full charge or full discharge to recover the full charge capacity, if it is judged that the full charge capacity acquired from the full charge capacity acquisition unit 500 is smaller than the full charge capacity that the battery 1078 should have depending on the total charge amount. For example, the restoration processing unit 560 performs a battery restoration process, if the present full charge capacity is smaller than the expected capacity calculated by the expected capacity calculation unit 520. In this case, the restoration processing unit 560 preferably performs the battery restoration process, providing that the time zone after the elapse of the full discharge time calculated by the full discharge time calculation unit 530 till the elapse of the full charge time calculated by the full charge time calculation unit 540 is the AC power source drive time zone.

In FIG. 5, for the explanation sake, the restoration processing determination unit 50 has a full charge capacity acquisition unit 500, a total charge amount acquisition unit 510, and an expected capacity calculation unit 520. Instead, the restoration processing determination unit 50 may not have the full charge capacity acquisition unit 500, the total charge amount acquisition unit 510, and the expected capacity calculation unit 520, and the restoration processing unit 560 may judge whether or not to perform the battery restoration process, employing the full charge capacity acquisition unit 442, the total charge amount acquisition unit 444, and the expected capacity calculation unit 446.

Figure 6:
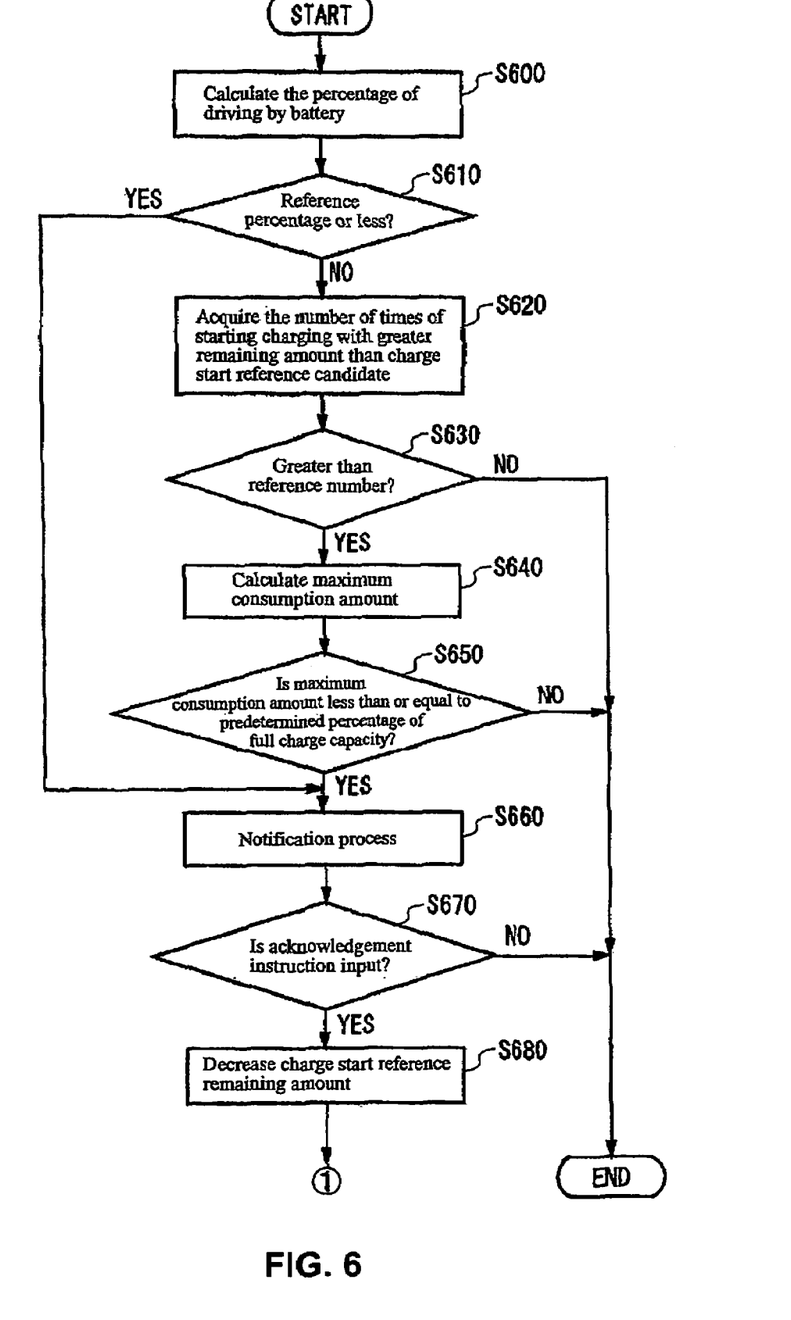
FIG. 6 shows an operation flow of a process in which the charge and discharge control unit 40 decreases a charge start reference remaining amount.

FIG. 6 shows an operation flow of a process in which the charge and discharge control unit 40 decreases a charge start reference remaining amount. The charge and discharge control unit 40 performs the following process, when the information processing apparatus 10 is connected to the AC power source, for example. First of all, the charge start reference setting unit 440 calculates the percentage of the time that the information processing apparatus 10 operates in the G0 state and is driven by the battery 1078 in the drive situation observation term (S600). For example, the charge start reference setting unit 440 calculates, as the percentage of the time that the information processing apparatus 10 operates in the G0 state and is driven by the battery 1078, the value multiplied by the percentage operating in the G0 state, when the information processing apparatus 10 can not be driven by the AC power source. And the charge start reference setting unit 440 transfers to step S660 to notify the user that the charge start reference remaining amount is changed, if the calculated percentage is less than or equal to the preset reference percentage (S610: YES).

On the other hand, the charge start number acquisition part 410 acquires the number of times that the remaining amount of the battery 1078 at the time of starting to charge in the drive situation observation term is more than the preset charge start reference remaining amount candidate below the charge start reference remaining amount, if the calculated percentage is higher than the reference percentage (S610: NO) (S620). For example, if the charge start reference remaining amount is set to 95% of the full charge capacity, the charge start number acquisition unit 410 acquires the number of times that the remaining amount of the battery 1078 at the start time of charge is more than 80% below 95% of the full charge capacity.

Subsequently, if the acquired number of times is greater than the preset reference number of times (e.g., 20) (S630: YES), the consumption amount calculation unit 420 calculates the maximum consumption amount that the information processing apparatus 10 consumes the battery 1078 continuously without being driven by the AC power source in the past (S640). For example, if the drive situation observation term is two weeks, this corresponds to an instance in which the charge is started about twice per day in a situation where the remaining amount of the battery 1078 is 80% or more.

A specific example of calculating the maximum consumption amount will be given below. The consumption amount calculation unit 420 first of all detects the time zone in which the information processing apparatus 10 is driven by the battery 1078 continuously without being driven by the AC power source in the past. And the consumption amount calculation unit 420 obtains the time in which the information processing apparatus operates in each of the G0, G1, and OFF states in each detected time zone. And the consumption amount calculation unit 420 calculates the consumption amount of the battery 1078 in each time zone by adding the amount of the battery 1078 consumed per unit time in each of the G0, G1 and OFF states multiplied by the time for which the information processing apparatus operates in each of the G0, G1 and OFF states. And the consumption amount calculation unit 420 calculates the maximum consumption amount by comparing the consumption amount of the battery 1078 obtained in each time zone.

Herein, the amount of the battery 1078 consumed per unit time in each of the G0, G1 and OFF states may be the actually measured amount, or the estimated amount by the manufacturer of the information processing apparatus 10. As one example, in this embodiment, it is considered that the amount of the battery 1078 consumed per unit time in the G1 state is 1/24 of that in the G0 state, and no amount of the battery is consumed in the OFF state.

The charge start reference setting unit 440 notifies the user that the charge start reference remaining amount is changed (S660), if the maximum consumption amount calculated by the consumption amount calculation unit 420 is less than or equal to a preset percentage of the full charge capacity of the battery 1078 (S650: YES). For example, when the maximum consumption amount calculated by the consumption amount calculation unit 420 is the charge start reference remaining amount candidate or 70% below 80% of the full charge capacity, it notifies the user that the charge start reference remaining amount is changed. And the charge start reference setting unit 440 decreases the charge start reference remaining amount (S680), providing that an instruction acknowledging that the charge start reference remaining amount is changed is inputted from the user (S670: YES).

At step S680, the charge start reference setting unit 440 preferably decreases the charge start reference remaining amount to the value of the charge start reference remaining amount candidate or less. Thereby, the charge start reference setting unit 440 prevents the repetition of charge, when the remaining amount of the battery 1078 is sufficiently large. More preferably, the charge start reference setting unit 440 decreases the charge start reference remaining amount to the value ranging from the maximum consumption amount to the charge start reference remaining amount, when the maximum consumption amount is smaller than the charge start reference remaining amount candidate. Thereby, the battery 1078 is less liable to be drained, as far as the user uses the apparatus in the similar way as in the past.

Instead, the charge start reference setting unit 440 may set the charge start reference remaining amount to 1.5 times the maximum consumption amount. Even in this case, the charge start reference setting unit 440 desirably sets the charge start reference remaining amount, so that the percentage of the charge start reference remaining amount to the full charge capacity is within a preset range, for example, from 75% to 95%. As one example, when the maximum consumption amount is 55% of the full charge capacity, the charge start reference setting unit 440 the charge start reference remaining amount to 1.5 times 55% of the full charge capacity, or about 83%.

As one example of a notification process, the charge start reference setting unit 440 displays the following message to the user, and the button for selecting "YES" or "NO".

"The system of the customer, mostly employing an AC adapter, is set up to start the charge if the remaining capacity of battery is 80% or less to extend the life of battery. When the remaining capacity of battery is above 80%, if the charge is needed urgently, push down an "emergency charge" button of the battery program. Do you accept to perform the change?"

In this message, the charge start reference setting unit 440 may notify, as an index indicating the remaining capacity of the battery 1078, how long the information processing apparatus 10 can be driven by the battery 1078, instead of the ratio of the remaining capacity to the full charge capacity of the battery 1078.

In this case, it is determined that the charge start reference setting unit 440 inputs an instruction acknowledging that the charge start reference remaining amount is changed from the user, if the user selects "YES".

In the above process, the information processing apparatus 10 can prevent the deterioration of the battery 1078 by setting up the charge start reference remaining amount in accordance with a use situation of the user in the past. Though the constitution as shown in FIG. 6 is only illustrative, the conditions for setting up the charge start reference setting unit 440 sets up the charge start reference remaining amount, based on the drive history information, but may set up different charge start reference remaining amount, depending on whether the normal mode or the power saving mode the information processing apparatus 10 is operating at present.

Figure 7:
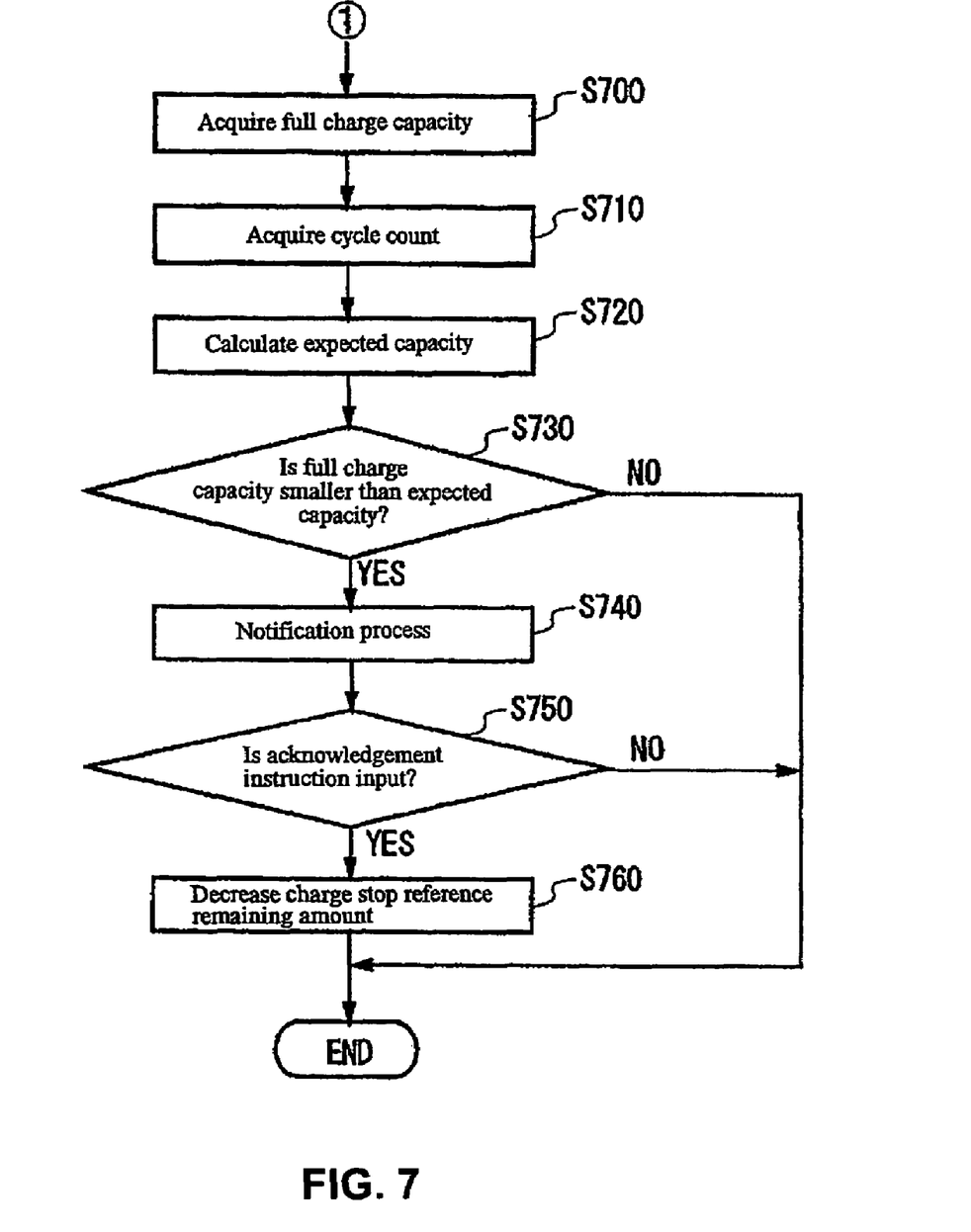
FIG. 7 shows an operation flow of a process in which the charge and discharge control unit 40 decreases a charge stop reference remaining amount.

FIG. 7 shows an operation flow of a process in which the charge and discharge control part 40 decreases a charge stop reference remaining amount. The full charge capacity acquisition unit 442 acquires the present full charge capacity of the battery 1078 (S700). The total charge amount acquisition unit 444 acquires the cycle count indicating the total charge amount from the start time of using the battery 1078 to the present time (S710). The expected capacity calculation unit 446 calculates the expected capacity that is the full charge capacity that the battery 1078 should have at present, depending on the full charge capacity (e.g., rated capacity) at the start time of using the battery 1078 and the cycle count (S720).

The charge stop reference setting unit 450 notifies the user that the charge stop reference remaining amount is changed (S740), if the present full charge capacity of the battery 1078 is smaller than the expected capacity (S730: YES). And the charge stop reference setting unit 450 decreases the charge stop reference remaining amount (S760), providing that it inputs an instruction acknowledging that the charge stop reference remaining amount is changed from the user (S750: YES). More specifically, the charge stop reference setting unit 450 changes the charge stop reference remaining amount to the amount greater by a preset necessary charge amount than the decreased charge start reference remaining amount. For example, when the charge start reference setting unit 440 decreases the charge start reference to 80%, the charge stop reference setting unit 450 changes the charge stop reference remaining amount of normally 100% to 95% that is greater by a necessary charge amount of 15 points than 80%. Thereby, the remaining amount of the battery 1078 is suppressed below the full charge capacity to prevent the deterioration of the battery 1078.

In this manner, the charge stop reference setting unit 450 can decrease the charge stop reference remaining amount of the battery 1078, based on the drive history information and the degree of deterioration of the battery. Thereby, only when the degree of deterioration of the battery 1078 is high and the convenience of the user is not impaired, the remaining amount of the battery 1078 is suppressed below the full charge capacity to prevent the battery 1078 from being further deteriorated. FIGS. 6 and 7 are illustrative, and various variations may be conceived. For example, in this embodiment, the charge start reference setting unit 440 decreases the charge start reference remaining amount, based on the drive history information, but alternatively or additionally the charge start reference remaining amount may be decreased, based on the degree of deterioration of the battery. For example, the charge start reference setting unit 440 may decrease the charge start reference remaining amount, when the present full charge capacity of the battery 1078 is smaller than the expected capacity.

Figure 8:
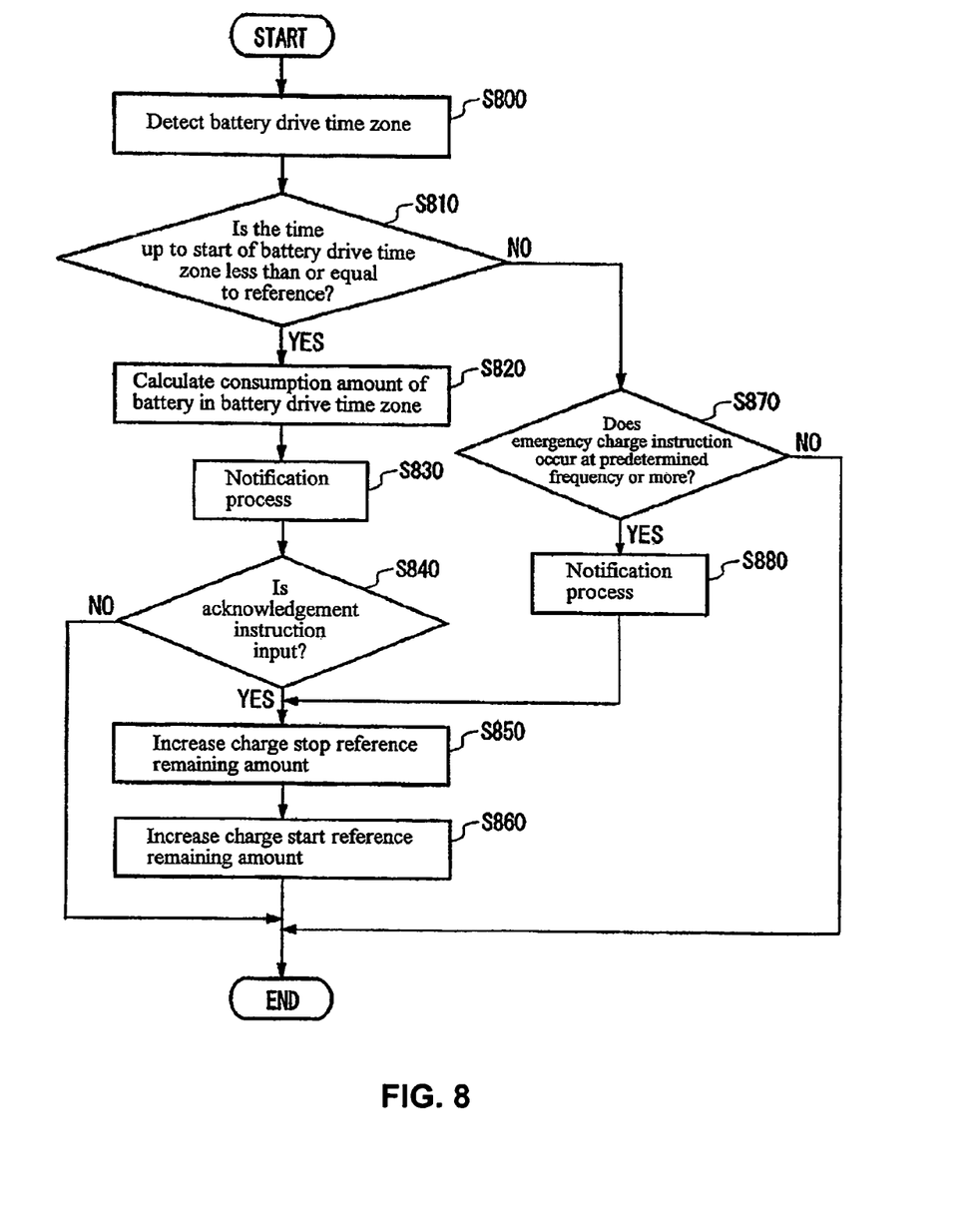
FIG. 8 shows an operation flow of a process in which the charge and discharge control unit 40 increases the charge start reference remaining amount or charge stop reference remaining amount.

FIG. 8 shows an operation flow of a process in which the charge and discharge control unit 40 increases the charge start reference remaining amount or charge stop reference remaining amount. The battery drive time zone detection unit 430 detects the battery drive time zone that is the continuous time zone in which the percentage of the time that the information processing apparatus 10 is driven by the battery 1078 is higher than a preset reference percentage, based on the drive history information (S800). For example, the battery drive time zone detection unit 430 calculates, for each time zone, the percentage of the time that the information processing apparatus 10 is driven by the battery 1078 by multiplying the percentage of the time that the information processing apparatus 10 can not be driven by the AC power source in the time zone by the percentage of the time that the information processing apparatus 10 operates in the G0 state or G1 state.

Each of the charge start reference setting unit 440 and the charge stop reference setting unit 450 determines whether or not the interval from the present time to the start of the next battery drive time zone is a preset reference time or less (S810). And if it is the preset reference time or less (S810: YES), the charge stop reference setting unit 450 calculates the consumption amount of the battery 1078 in the past in the battery drive time zone (S820).

For example, the charge stop reference setting unit 450 calculates, in each time zone included in the battery drive time zone, the estimation that the information processing apparatus 10 consumes the battery 1078 in the time zone by multiplying the percentage of the time that the information processing apparatus 10 is driven by the AC power source in the time zone in the past, the percentage of the time that the information processing apparatus 10 operates in the G0 state, and the battery consumption amount when the information processing apparatus 10 continues to operate in the G0 state in the time zone. And the charge stop reference setting unit 450 calculates a sum of estimation in each time zone of the battery drive time zone as the past consumption amount of the battery 1078 in the battery drive time zone.

Subsequently, the charge start reference setting unit 440 notifies the user that the charge start reference remaining amount is increased, and the charge stop reference setting unit 450 notifies the user that the charge stop reference remaining amount is increased (S830). And if an instruction acknowledging that the charge stop reference remaining amount and the charge stop reference remaining amount are increased is input (S840: YES), the charge stop reference setting unit 450 increases the charge stop reference remaining amount above the already set charge stop reference remaining amount (S850), and the charge start reference setting unit 440 increases the charge start reference remaining amount above the already set charge start reference remaining amount (S860).

Herein, the charge stop reference setting unit 450 preferably changes the charge stop reference remaining amount above the consumption amount of the battery 1078 in the past in the next battery drive time zone that is calculated at step S720. For example, the charge stop reference setting unit 450 may set the charge stop reference remaining amount to 1.5 times the battery consumption amount.

On the other hand, if the interval from the present time to the start of the next battery drive time is longer than the preset reference time (S810: NO), the following process is performed. If the emergency charge instruction is input from the user at a frequency beyond the preset reference in a drive situation observation period, for example (S870: YES), the charge start reference setting unit 440 notifies the user that the charge start reference remaining amount and the charge stop reference remaining amount are increased (S880).

As one example of the notification process, the charge start reference setting unit 440 displays the following message to the user.

"It is convenient that the remaining amount of the battery is always 95% at the connection time of AC adapter because the use condition of the system by the user is changed. The value of remaining capacity to start charging the battery is set to 95%."

Subsequently, the procedure transfers to step S850 and step S860 to increase the charge stop reference remaining amount and the charge start reference remaining amount.

Through the above process as shown in FIG. 8, the charge stop reference remaining amount and the charge start reference remaining amount can be restored or increased, if there is high possibility that the battery 1078 is consumed, even when the charge stop reference remaining amount and the charge start reference remaining amount are once decreased. Thereby, if there is high possibility that the information processing apparatus 10 is driven by the battery 1078, the convenience of the user is assured.

Figure 9:
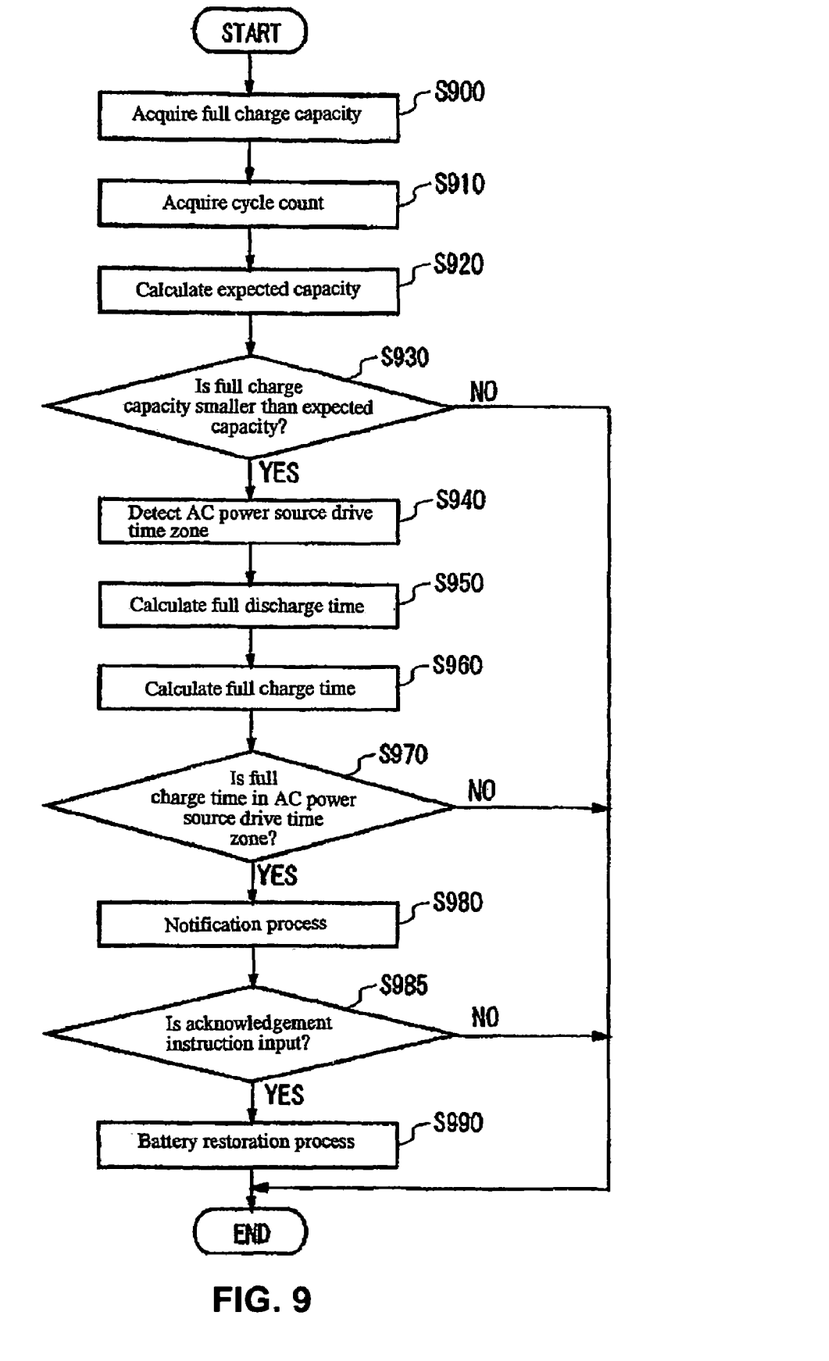
FIG. 9 shows an operation flow in which the restoration process determination unit 50 makes a battery restoration process.

FIG. 9 shows an operation flow in which the restoration process determination unit 50 makes a battery restoration process. The full charge capacity acquisition unit 500 acquires the present full charge capacity of the battery 1078 (S900). The total charge amount acquisition unit 510 acquires the cycle count indicating the total charge amount from the start time of using the battery 1078 to the present time from the drive history information storage part 20 (S910). The cycle count as used herein means the value that increments by one every time the total charge amount of the battery 1078 reaches a predetermined percentage (e.g., 85%) of the full charge capacity of the battery 1078. The total charge amount acquisition unit 510 may acquire the other information indicating the total charge amount from the start time of using the battery 1078 to the present time, but not the cycle count.

The expected capacity calculation unit 520 calculates the expected capacity that is the full charge capacity that the battery 1078 should have at present, depending on the full charge capacity (e.g., rated capacity) at the start time of using the battery 1078 and the cycle count (S920). For example, the expected capacity calculation unit 520 calculates the expected capacity by subtracting the decrease amount of the full charge capacity for one cycle count multiplied by the acquired cycle count from the full charge capacity at the start time of using the battery 1078. One example of the calculation method is shown.

Assuming that the ratio of the decrease amount that the full charge capacity decreases for one cycle count is 1/15, the cycle count is X and the proportion of the full charge capacity to the rated capacity is Add, the proportion Y of the expected capacity to the rated capacity is represented by the following expression.

$$Y = -X/15 + Add$$

To restrain the restoration process from being performed too frequently, it is desirable that Add is set to a smaller value by a predetermined amount than the proportion of the full charge capacity to the rated capacity. Also, when the battery restoration process is once performed by the restoration processing unit 560, the expected capacity calculation unit 520 deals with, as the full charge capacity at the start time of using the battery 1078, the capacity obtained by adding the decrease amount that the full charge capacity decreases for one cycle count, multiplied by the cycle count at the time of performing the battery restoration process, to the full charge capacity before starting to use the battery 1078 after the battery restoration process.

And the restoration processing unit 560 ends the process of FIG. 9, when the present full charge capacity is greater than or equal to the expected capacity calculated by the expected capacity calculation unit 520 (S930: NO). On the other hand, when the present full charge capacity is smaller than the expected capacity calculated by the expected capacity calculation unit 520 (S930: YES), the AC power source drive time zone detection unit 550 detects, as the AC power source drive time zone in which the information processing apparatus 10 is expected to be driven by the AC power source, the time zone in which the percentage that the information processing apparatus 10 is driven by the AC power source in the past is higher than a preset reference (S940).

Alternatively, the restoration processing unit 560 may acquire the full charge capacity and the total charge amount periodically, for example, and calculate the decrease rate of the full charge capacity of the battery 1078 decreasing in accordance with the total charge amount, based on a plurality of acquired full charge capacities and total charge amounts. In this case, the restoration processing unit 560 determines that the full charge capacity of the battery 1078 is smaller than the expected capacity, if the calculated decrease rate is higher than the preset reference decrease rate corresponding to the battery 1078. Thereby, when the full charge capacity is predicted to be smaller than the expected capacity, the battery restoration process can be performed before the full charge capacity is actually smaller than the expected capacity.

The full discharge time calculation unit 530 calculates the full discharge time that is the estimation of the time required to perform a process for fully discharging the battery, based on the present remaining amount of the battery 1078 acquired from the power source control unit 1075 (S950). The full discharge time calculation unit 530 may calculate, as the full discharge time, the time required for the full discharge that is calculated based on the present remaining amount of the battery 1078 to which a predetermined value (e.g., 30 minutes) is added. The full charge time calculation unit 540 calculates the full charge time that is the estimation of the time required from the fully discharged state of the battery 1078 to the fully charged state by obtaining the time required to charge the full charge capacity acquired from the drive history information storage part 20, for example (S960). Similarly, the full charge time calculation unit 540 may calculate, as the full charge time, the time required to charge the full charge capacity to which a predetermined value (e.g., 30 minutes) is added.

The restoration processing unit 560 ends the process, if the time zone after the elapse of the full discharge time calculated by the full discharge time calculation unit 530 till the elapse of the full charge time calculated by the full charge time calculation unit 540 is not the AC power source drive time zone (S970: NO). On the other hand, the restoration processing unit 560 notifies the user that the battery restoration process is performed, if the time zone after the elapse of the full discharge time calculated by the full discharge time calculation unit 530 till the elapse of the full charge time calculated by the full charge time calculation unit 540 is the AC power source drive time zone (S970: YES). In this case, it is desirable that the restoration processing unit 560 notifies the user that the battery restoration process is interrupted and the charge is started by pushing down an emergency charge button, even during execution of the battery restoration process.

The restoration processing unit 560 performs the battery restoration process (S990), if an instruction acknowledging that the battery restoration process is performed (S985: YES). For example, the restoration processing unit 560 performs the battery restoration process in which the full discharge and the full charge of the battery 1078 are made in this order. Also, the restoration processing unit 560 may make the full charge of the battery 1078 ahead and then make the full discharge in accordance with the kind of the battery 1078 that is an object of the battery restoration process. Also, the restoration processing unit 560 may perform the battery restoration process multiple times, when the full charge capacity is not increased by one battery restoration process. If the battery restoration process is repeated too many times, the battery 1078 is liable to deteriorate earlier, whereby the upper limit of performing the process is desirably provided.

Figure 10:
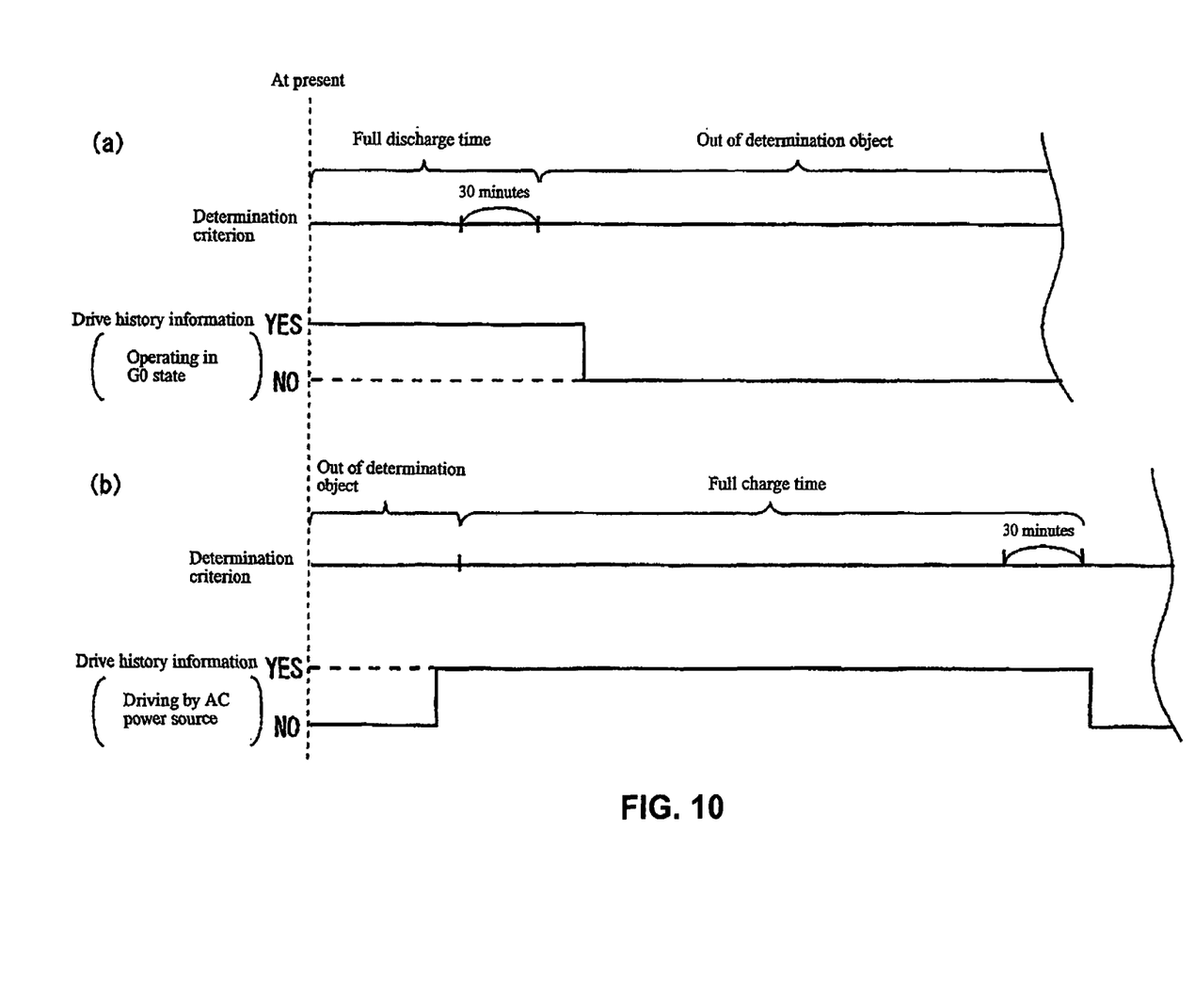
FIG. 10 is a chart for explaining the battery restoration process timing.

FIG. 10 is a chart for explaining the battery restoration process timing. For example, when the information processing apparatus 10 can make the full discharge only in the G0 state, it is desirable that the restoration processing unit 560 determines the condition as indicated in (a). More specifically, the full discharge time calculation unit 530 calculates the estimation of full discharge time by adding 30 minutes to the time for fully discharging the battery 1078. And the restoration processing unit 560 determines that the full discharge is appropriately made, if the percentage that the information processing apparatus 10 operates in the G0 state is greater than or equal to a predetermined percentage (e.g., 75%) in the time zone in the past from the present time to the end time of the full discharge based on the drive history information. Thereby, even when the information processing apparatus 10 does not have a compulsory quick discharge function, the time required for the full discharge can be appropriately kept.

Also, the restoration processing unit 560 further determines the condition as indicated in (b). More specifically, the full charge time calculation unit 540 calculates the estimation of full charge time by adding 30 minutes to the time for fully charging the battery 1078. And the restoration processing unit 560 determines that the full charge is appropriately made, if the percentage that the information processing apparatus 10 is driven by the AC power source is greater than or equal to the predetermined percentage (e.g., 75%) in the time zone in the past after the elapse of full discharge time till the end of the full charge based on the drive history information.

Thereby, there is less possibility that the AC power source is interrupted during processing of full charge, and the battery restoration process is appropriately performed.

Moreover, the restoration processing unit 560 may determine the process as shown in FIG. 10 from not only the present time but also any time in one week as the start point. With this method, the restoration processing unit 560 can not only determine whether the battery restoration process should be performed at present, but also detect the time appropriate for starting the battery restoration process. In this case, the restoration processing unit 560 may output a plurality of times appropriate for starting the battery restoration process, and start the battery restoration process at the time selected from among the output times by the user.

Furthermore, when any AC power source drive time zone is shorter than the time required for full charge, the restoration processing unit 560 preferably performs the battery restoration process in the longest time zone in the detected AC power source drive time zone. Also, in this case, the restoration processing unit 560 may display the start times in the plurality of AC power source drive time zones to the user, and perform the battery restoration process at the time selected from among the displayed start times by the user.

As described above, in this embodiment, the information processing apparatus 10 can appropriately set up the timings of charge start and charge stop for the rechargeable battery to prevent the battery from being deteriorated without impairing the convenience of the user. Also, when the battery is not deteriorated, the battery restoration process is performed to recover the full charge capacity of the battery by appropriately detecting that the battery is deteriorated.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
a rechargeable battery;
a full charge capacity circuit, coupled to said battery, which acquires a present full charge capacity which said battery has at the present time, the full charge capacity being a capacity in a state where said battery is fully charged, and the full charge capacity being decreased by repeatedly charging or discharging said battery;
a total charge circuit, coupled to said battery, which acquires information indicating a total amount of charge provided to said battery in a time period from a start time of using said battery until the present full charge capacity is acquired;
a first circuit, coupled to said battery, which performs battery management by fully discharging or fully charging said battery if the present full charge capacity is smaller than an expected full charge capacity that said battery should have depending on the information; and
an expected capacity circuit, coupled to said total charge circuit and said first circuit, which calculates an expected capacity that is the expected full charge capacity, based on the full charge capacity at the start time of using said battery and the total amount of charge, wherein said first circuit performs the battery management, if the present full charge capacity acquired is smaller than the expected capacity calculated by said expected capacity circuit.

2. Apparatus according to claim 1, wherein said total charge circuit acquires a cycle count that increments by one every time the total amount of charge reaches a predetermined percentage of the full charge capacity, as the information indicating the total amount of charge, and said expected capacity circuit calculates the expected capacity by subtracting a decrease amount of the full charge capacity decreasing at one cycle count, multiplied by the acquired cycle count, from the full charge capacity at the start time of using said battery.

3. Apparatus according to claim 2, wherein said expected capacity circuit calculates, as the full charge capacity at the start time of using said battery, the full charge capacity before starting the use of said battery after the battery management to which the decrease amount is added.

4. Apparatus according to claim 1, wherein said first circuit calculates a decrease rate at which the full charge capacity of said battery decreases in accordance with the total amount of charge, based on a plurality of the present full charge capacities and a plurality of the total amount of charge that are acquired, and judges that the present full charge capacity of said battery is smaller than the expected full charge capacity, if the calculated decrease rate is higher than a preset reference decrease rate corresponding to said battery.

5. A method comprising:
controlling a rechargeable battery in an information processing apparatus driven by the rechargeable battery, by:
acquiring a present full charge capacity that is a full charge capacity which said battery has at the present time, said full charge capacity being a capacity in a state where said battery is fully charged, and said full charge capacity being decreased by repeatedly charging or discharging said battery;
acquiring information indicating a total amount of charge provided to said battery in a time period from a start time of using said battery until said present full charge capacity is acquired; and
performing a battery management by fully discharging or fully charging said battery if the present full charge capacity acquired is smaller than an expected full charge capacity that said battery should have depending on the information.

6. Apparatus comprising:
a rechargeable battery;
a full charge capacity circuit, coupled to said battery, which acquires a present full charge capacity which said battery has at the present time, the full charge capacity being a capacity in a state where said battery is fully charged, and the full charge capacity being decreased by repeatedly charging or discharging said battery;
a total charge circuit, coupled to said battery, which acquires information indicating a total amount of charge provided to said battery in a time period from a start time of using said battery until the present full charge capacity is acquired; and
a first circuit, coupled to said battery, which performs battery management by fully discharging and fully charging said battery if the present full charge capacity is smaller than an expected full charge capacity that said battery should have depending on the information.

* * * * *